US009995904B2

United States Patent
Lee et al.

(10) Patent No.: US 9,995,904 B2
(45) Date of Patent: Jun. 12, 2018

(54) ACTUATOR DRIVING DEVICE AND CAMERA MODULE INCLUDING THE SAME

(71) Applicant: Samsung Electro-Mechanics Co., Ltd., Suwon-si (KR)

(72) Inventors: Byung Hoon Lee, Suwon-si (KR); Jae Ho Baik, Suwon-si (KR); Shin Young Cheong, Suwon-si (KR); Sang Ho Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/230,730

(22) Filed: Aug. 8, 2016

(65) Prior Publication Data

US 2017/0045710 A1    Feb. 16, 2017

(30) Foreign Application Priority Data

Aug. 14, 2015 (KR) .......................... 10-2015-0115051
May 20, 2016 (KR) .......................... 10-2016-0062192

(51) Int. Cl.
*H04N 5/232* (2006.01)
*G02B 7/28* (2006.01)
*G02B 27/64* (2006.01)
*G02B 7/09* (2006.01)

(52) U.S. Cl.
CPC ................. *G02B 7/28* (2013.01); *G02B 7/09* (2013.01); *G02B 27/646* (2013.01); *H04N 5/23287* (2013.01)

(58) Field of Classification Search
CPC .......... G02B 7/28; G02B 7/09; G02B 27/646; H04N 5/23287
See application file for complete search history.

(56) References Cited

U.S. PATENT DOCUMENTS

| 5,526,165 | A | * | 6/1996 | Toda | ...................... B82Y 35/00 250/234 |
| 5,978,600 | A | * | 11/1999 | Takeuchi | ............. G02B 27/646 396/53 |
| 6,341,107 | B1 | * | 1/2002 | Watanabe | .......... G11B 7/08517 369/44.25 |
| 8,716,959 | B2 | | 5/2014 | David et al. | |
| 9,678,493 | B2 | | 6/2017 | Ishikawa et al. | |

(Continued)

FOREIGN PATENT DOCUMENTS

| JP | 2009-180990 A | 8/2009 |
| JP | 2013-205550 A | 10/2013 |

(Continued)

OTHER PUBLICATIONS

Korean Office Action dated Mar. 1, 2018 in corresponding Korean Patent Application No. 10-2016-0062192 (4 pages in Korean and 5 pages English).

*Primary Examiner* — Shahbaz Nazrul
(74) *Attorney, Agent, or Firm* — NSIP Law

(57) ABSTRACT

An actuator driving device includes: a linearizer configured to linearize a first signal, indicative of a displacement of a lens module, to generate a second signal; a position controller configured to generate a position control signal in response to the second signal and a control input signal indicative of a target location of the lens module; and a driver configured to drive an actuator in response to the position control signal.

19 Claims, 15 Drawing Sheets

(56) References Cited

U.S. PATENT DOCUMENTS

| | | | | |
|---|---|---|---|---|
| 2001/0012074 A1* | 8/2001 | Ohkawara | ......... | H04N 5/23212 348/240.3 |
| 2011/0043646 A1* | 2/2011 | Watanabe | ............ | G02B 27/646 348/208.4 |
| 2014/0104486 A1* | 4/2014 | Seol | ........................ | G02B 7/08 348/357 |
| 2014/0355119 A1* | 12/2014 | Matsumoto | .............. | G02B 7/08 359/557 |
| 2014/0379103 A1* | 12/2014 | Ishikawa | ................. | G03B 5/00 700/56 |
| 2016/0080658 A1* | 3/2016 | Tanaka | .................. | G02B 7/102 348/369 |
| 2016/0261784 A1* | 9/2016 | Mukunashi | .......... | H04N 5/2353 |
| 2016/0269644 A1* | 9/2016 | Cheong | .............. | H04N 5/23287 |
| 2016/0327806 A1* | 11/2016 | Kasamatsu | .......... | G02B 27/646 |

FOREIGN PATENT DOCUMENTS

| | | |
|---|---|---|
| KR | 10-0880672 B1 | 2/2009 |
| KR | 10-2012-0048071 A | 5/2012 |
| WO | WO 2009/011547 A1 | 1/2009 |

\* cited by examiner

ACTUATOR DRIVING DEVICE AND CAMERA MODULE INCLUDING THE SAME

CROSS-REFERENCE TO RELATED APPLICATIONS

This application claims the benefit of Korean Patent Application No. 10-2015-0115051 filed on Aug. 14, 2015 and Korean Patent Application No. 10-2016-0062192 filed on May 20, 2016, in the Korean Intellectual Property Office, the entire disclosures of which are incorporated herein by reference for all purposes.

BACKGROUND

1. Field

The following description relates to an actuator driving device and a camera module including the same.

2. Description of Related Art

Generally, a camera module mounted in an electronic apparatus includes a lens module and an image sensor for converting an image of an object into an electrical signal. The lens module may be disposed in a housing, and includes a lens barrel having lenses disposed therein. In addition, the camera module may be a single focus type camera module for imaging an object using a fixed focus. However, recently, in accordance with technological developments, a camera module including an actuator enabling auto-focusing to be performed has been adopted. In addition, the camera module may include an actuator for an optical image stabilization (OIS) function in order to reduce resolution loss, or blurring, caused by hand-shake.

An actuator driving device is used in order to drive the actuator for auto-focusing. The actuator driving device receives information on a movement position of the lens module, that is, a detection signal corresponding to displacement of the lens module, and drives the actuator in order to move the lens module to a target position.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator driving device includes: a linearizer configured to linearize a first signal, indicative of a displacement of a lens module, to generate a second signal; a position controller configured to generate a position control signal, in response to the second signal and a control input signal indicative of a target location of the lens module; and a driver configured to drive an actuator in response to the position control signal.

The linearizer may be further configured to linearize the first signal using a correction parameter.

The correction parameter may be set by comparing the first signal with a signal having linearity with respect to the displacement of the lens module.

The linearizer may be further configured to generate an intermediate parameter by interpolation based on a correction parameter, and to linearize the first signal using the intermediate parameter and the correction parameter.

The linearizer may be further configured to linearize the first signal using a correction function.

The correction function is may reflect an offset to approximate the first signal to a signal having linearity with respect to the displacement of the lens module, and may reflect a curvature.

The actuator driving device may further include a position detector configured to: sense a strength of a magnetic field, produced by a magnetic body disposed in the lens module, to detect the displacement of the lens module; and provide the first signal based on the sensed strength of the magnetic field.

The position controller may include: a position error calculator configured to calculate error information between the control input signal and the second signal; and a controller configured to provide the position control signal depending on the error information.

The position controller may further include a switch configured to: select one of the control input signal and the position control signal depending on an output selection control signal; and output the selected signal to the driver.

In another general aspect, a camera module includes: an actuator configured to move a lens module; a position detector configured to detect a displacement of the lens module and to generate a first signal based on the detected displacement of the lens module; a linearizer configured to linearize the first signal to produce a second signal; a position controller configured to generate a position control signal in response to the second signal and a control input signal indicative of a target location of the lens module; and a driver configured to drive the actuator based on the position control signal.

The linearizer may be further configured to linearize the first signal using a correction parameter.

The correction parameter may be set by comparing the first signal with a signal having linearity with respect to the displacement of the lens module.

The linearizer may be further configured to linearize an intermediate parameter by interpolation based on a correction parameter, and to linearize the first signal using the intermediate parameter and the correction parameter.

The linearizer may be further configured to linearize the first signal using a correction function.

The correction function may be a function reflecting an offset for approximating the first signal to a signal having linearity with respect to the displacement of the lens module, and reflecting a curvature.

The position controller may include: a position error calculator configured to calculate error information between the control input signal and the second signal; a controller configured to generate the position control signal by correcting the control input signal using the error information; and a switch configured to select one of the control input signal and the position control signal based on an output selection control signal, and to output the selected signal to the driver.

In another general aspect, an apparatus includes: a linearizer configured to linearize a first signal indicative of a displacement of a lens module, using a correction parameter or a correction function, to generate a second signal, and configured to transmit the second signal to a position controller to generate a position control signal to drive an actuator to move the lens module.

The apparatus may be configured to linearize the first signal using the correction parameter, and the correction parameter may be set by comparing the first signal with a signal having linearity with respect to the displacement of the lens module.

The linearizer may be further configured to generate an intermediate parameter by interpolation based on the correction parameter, and to linearize the first signal using the intermediate parameter and the correction parameter.

The linearizer may be configured to linearize the first signal using the correction function. The correction function may reflect an offset to approximate the first signal to a signal having linearity with respect to the displacement of the lens module, and may reflect a curvature.

In another general aspect, a method to set correction parameters in a lens module includes: measuring actual positions of the lens module within a rated stroke section; setting the correction parameters to correct a position detection signal, generated by a position detector, into the actual positions; and activating a linearizer to linearize the position detection signal using the correction parameters.

The method may further include generating intermediate parameters by interpolation based on the correction parameters, and linearizing the position detection signal using the intermediate parameters and the correction parameters.

The position detection signal may be generated based on sensing a strength of a magnetic field produced by a magnetic body disposed in the lens module.

In another general aspect, a method to operate an actuator includes: sensing, using a position detector, a strength of a magnetic field produced by a magnetic body disposed in a lens module, to detect a displacement of the lens module; generating, using the position detector, a first signal indicative of the detected displacement; generating, using a linearizer, a second signal, by applying the correction parameter to linearize the first signal; receiving a control input signal indicative of a target location of the lens module; and, in response to the second signal and the control input signal, generating, using a position controller, a position control signal to drive the actuator.

The applying of the correction parameter to linearize the first signal may include: generating an intermediate parameter by interpolation based on the correction parameter; and linearizing the first signal using the intermediate parameter and the correction parameter.

The correction parameter may be based on a comparison of the first signal with a signal having linearity with respect to the detected displacement.

Other features and aspects will be apparent from the following detailed description, the drawings, and the claims.

Figure 1:
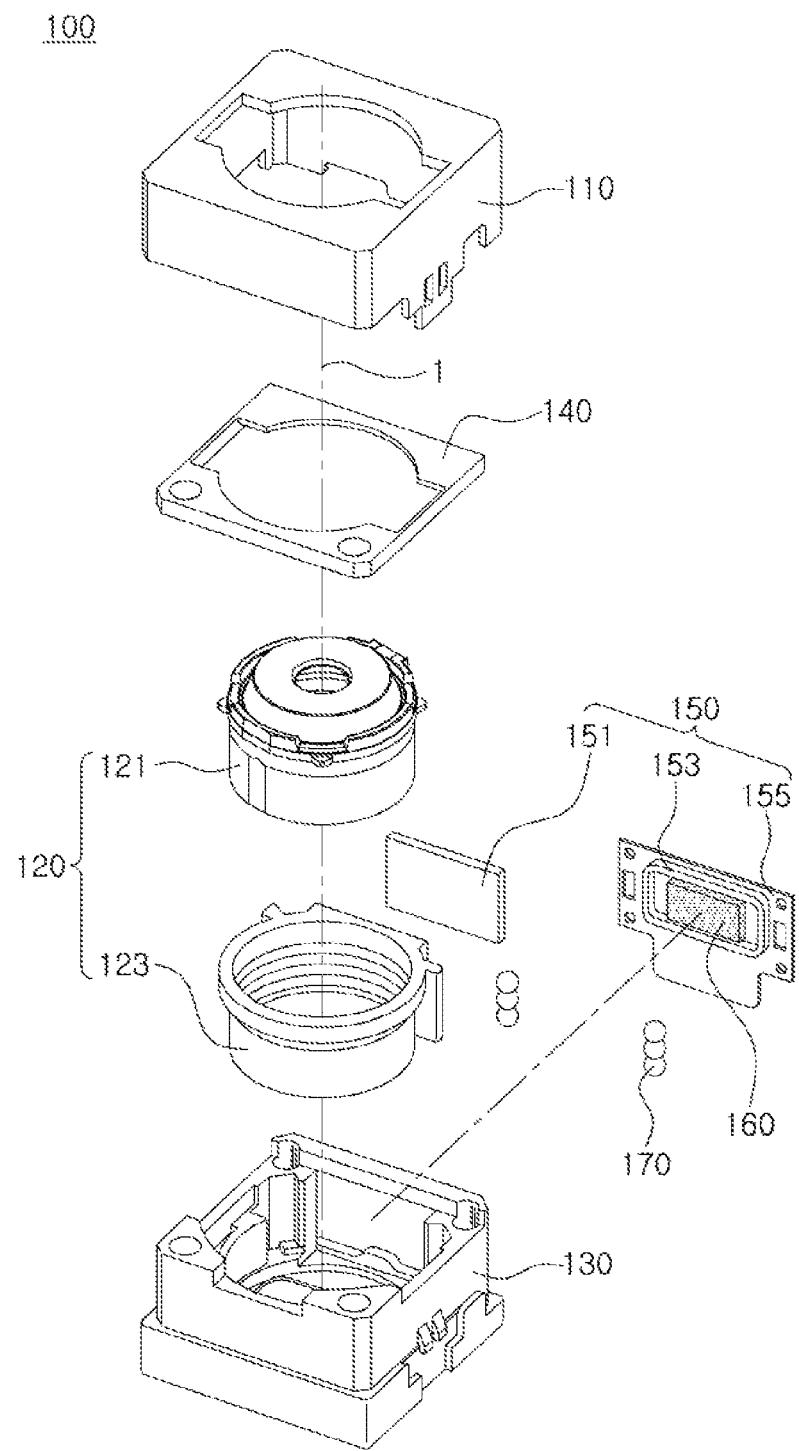
FIG. 1 is an exploded perspective view illustrating a camera module, according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent. Further, although the examples described herein have a variety of configurations, other configurations are possible as will be apparent.

Before an actuator driving device according to an embodiment in the disclosure is described in detail, examples of camera modules including such an actuator driving device will be described with reference to FIGS. 1 through 3.

Referring to FIG. 1, a camera module 100, according to an embodiment, includes a shield case 110, a lens module 120, a housing 130, a stopper 140, an actuator 150, an actuator driving device 160, and a ball bearing part 170. The lens module 120 includes a lens barrel 121 and a lens holder 123 accommodating the lens barrel 121 in the lens holder 123.

The lens barrel 121 may have a hollow cylindrical shape so that a plurality of lenses for imaging an object may be accommodated therein, and the plurality of lenses may be provided in the lens barrel 121 in an optical axis direction 1.

The plurality of lenses may include a number of stacked lenses. The number of lenses may depend on a design of the lens module 120, and the lenses may have optical characteristics such as the same refractive index, or different refractive indices, or the like.

The lens barrel 121 may be coupled to the lens holder 123. For example, the lens barrel 121 may be inserted into a hollow provided in the lens holder 123, and the lens barrel 121 and the lens holder 123 may be coupled to each other by a screw fastening scheme or by an adhesive.

The lens module 120 may be accommodated in the housing 130 and may move in the optical axis direction 1 for the purpose of auto-focusing. To enable an auto-focusing operation, the actuator 150 may be provided.

The actuator 150 includes a magnetic body 151 and a coil 153 configured to move the lens module 120 in the optical axis direction 1. The magnetic body 151 may be mounted on one side of the lens holder 123, and the coil 153 may be disposed to face the magnetic body 151. The coil 153 may be mounted on a substrate 155. The substrate 155 may be mounted on the housing 130 so that the coil 153 faces the magnetic body 151.

The actuator driving device 160 may be mounted on the substrate 155, and may output a signal (for example, a current signal) for driving the actuator 150 depending on a control input signal. The actuator 150 may receive the signal for driving the actuator and may generate driving force that moves the lens module 120 in the optical axis direction 1.

In detail, the current signal may be supplied from the actuator driving device 160 to the coil 153 included in the actuator 150 to form an electric field. The electric field may interact with a magnetic field of the magnetic body 151 to generate driving force moving the lens module 120 in the optical axis direction 1 according to Fleming's left hand rule.

The magnetic body 151 may react to the magnetic field generated when a current flows to the coil 153, thereby generating driving force. For example, the magnetic body 151 may include a first magnetic body and a second magnetic body. The first magnetic body and the second magnetic body may be formed by polarization of the magnetic body 151. Therefore, movement of the lens module 120 may be easily controlled.

Additionally, at least one of the first magnetic body or the second magnetic body may be used for the actuator driving device 160 to detect a position of the lens module 120. Alternatively, a magnetic body for detecting a position of the lens module 120 may also be disposed on the lens module 120. For example, the magnetic body for detecting a position of the lens module 120 may be disposed on a portion of an outer surface of the lens holder 123 on which the coil 153 is not formed.

In addition, the actuator driving device 160 may include a position detector. The position detector may sense a magnetic field radiated by the magnetic body for detecting a position of the magnetic body and output a result of the sensing of the magnetic field to the actuator driving device 160. The actuator driving device 160 may determine displacement of the lens module 120 depending on the result of the sensing of the magnetic field.

The position detector may be formed by an integrated circuit together with the actuator driving device 160 or may be provided as an element separate from the actuator driving device 160.

A detailed configuration and a function of the actuator driving device 160, according to an example, will be described below with reference to FIGS. 5 through 11.

Still referring to FIG. 1, the ball bearing part 170 may be provided in the housing 130 as a guide unit. More specifically, when the lens module 120 moves within the housing 130 in the optical axis direction 1, the ball bearing part 170 may guide the movement of the lens module 120.

The ball bearing part 170 may include one or more ball bearings. In a case in which the ball bearing part 170 includes a plurality of ball bearings, the plurality of ball bearings may be stacked in the optical axis direction 1. Additionally, multiple ball bearing parts 170 may be provided. In such a case, the ball bearing parts 170 may be spaced apart from each other in a direction perpendicular to the optical axis direction in relation to the magnetic body 151.

The ball bearing part 170 may contact an outer surface of the lens holder 123 and an inner surface of the housing 130 to guide the movement of the lens module 120 in the optical axis direction 1. That is, the ball bearing part 170 may be disposed between the lens holder 123 and the housing 130, and may guide the movement of the lens module 120 in the optical axis direction through a rolling motion.

Additionally, the stopper 140 may be mounted on the housing 130 to limit a moving distance of the lens module 120 in the optical axis direction 1.

For example, the stopper 140 may be mounted on the housing 130, and the stopper 140 and the lens module 120 may be spaced apart from each other in the optical axis direction 1 in a case in which power is not applied to the coil 153.

Therefore, when power is applied to the coil 153 to move the lens module 120 in the optical axis direction, the moving distance of the lens module 120 may be limited by the stopper 140, and thus, the lens module 120 may move only within an interval range between the lens module 120 and the stopper 140.

The stopper 140 may be formed of an elastic material. When the stopper is formed of an elastic material, impacts resulting from the stopper 140 and the lens module 120 colliding with each other may be dampened.

In a case in which electromagnetic waves generated at the time of driving the camera module 100 are emitted outside of the camera module, the electromagnetic waves may affect other electronic components, which may cause communications errors or malfunctions. Therefore, the shield case 110 may be coupled to the housing 130 to enclose outer surfaces of the housing 130, and may serve to block electromagnetic waves generated during driving of the camera module 100.

The shield case 110 may be formed of a metal material and may be grounded to a ground pad of a substrate mounted beneath the housing 130, such that the shield case 110 may block electromagnetic waves. Further, in another example, the shield case 110 is formed of a plastic injection-molded part, and conductive paint is applied to inner surfaces of the shield case 110, on the plastic injection-molded part, to block the electromagnetic waves.

In an example, a conductive epoxy is used as the conductive paint, but the material of the conductive paint is not limited to a conductive epoxy. That is, various materials having conductivity may be used, and a conductive film or conductive tape may be attached to the inner surfaces of the shield case 110 to provide the desired shielding performance.

Figure 2:
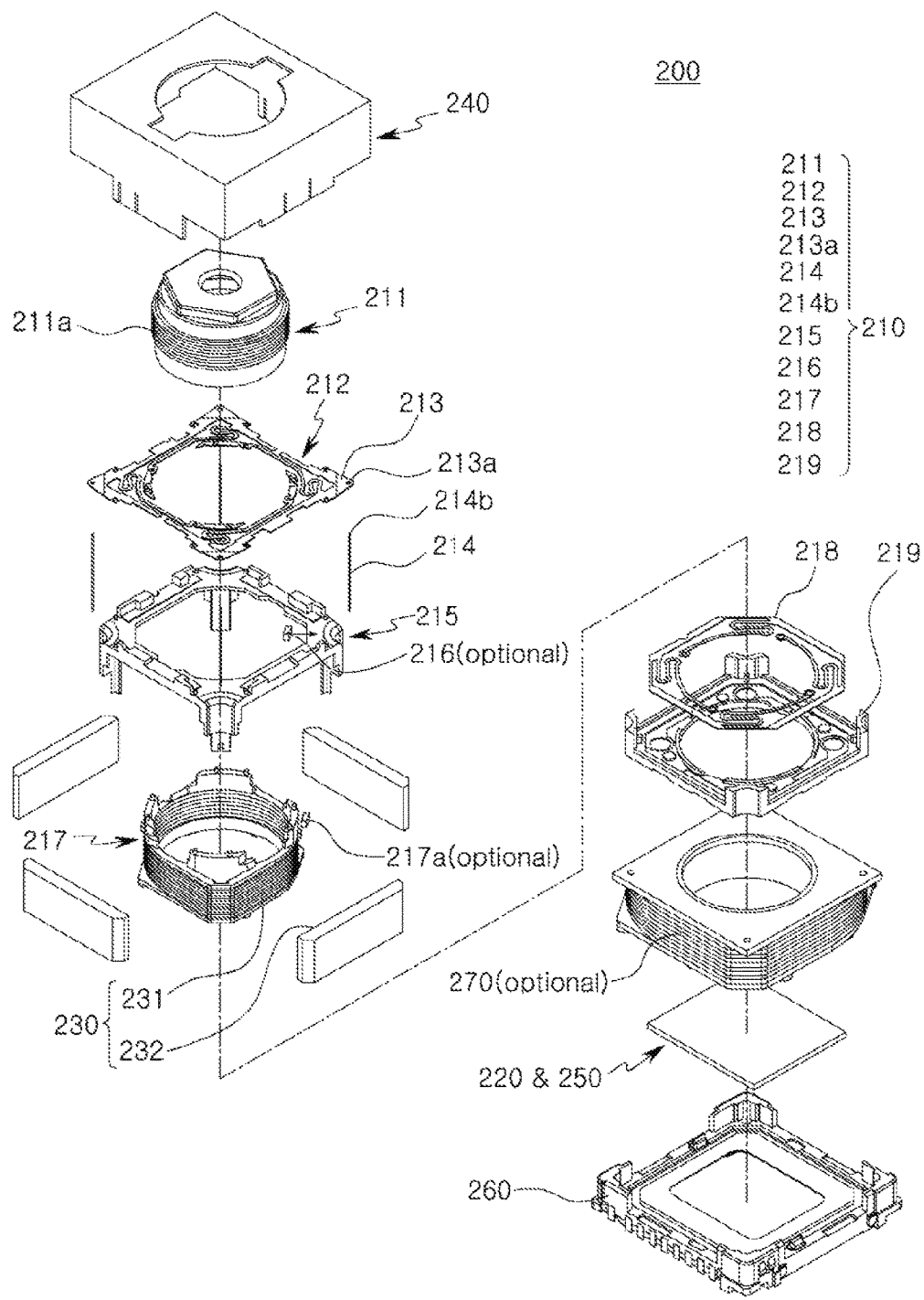
FIG. 2 is an exploded perspective view illustrating a camera module, according to another embodiment.

FIG. 2 is an exploded perspective view illustrating a camera module 200, according to another embodiment. Referring to FIG. 2, the camera module 200 includes a lens module 210, a shield case 240, and a housing 260. The lens module 210 includes a lens barrel 211 and a lens carrier 217. The shield case 240 may be coupled to the housing 260 to form a housing unit, and may be coupled to the housing 260 to enclose outer surfaces of the housing 260, thereby serving to block electromagnetic waves generated during driving of the camera module 200.

A coil 231 may be disposed on an outer peripheral surface of the lens carrier 217. The coil 231 may be wound on the outer peripheral surface of the lens carrier 217 or a plurality of wound coils may be disposed on the outer peripheral surface of the lens carrier 217. A plurality of magnetic bodies 232 may be disposed in the lens module 210 to interact with the coil 231, depending on the disposition of the coil 231. For example, four magnetic bodies 232 may be provided. The coil 231 and the magnetic body 232 may constitute a first actuator 230, and driving force that may move the lens carrier 217 in the optical axis direction may be generated by interaction between an electric field of the coil 231 and a magnetic field of the magnetic body 232. The magnetic body 232 may include first and second magnetic bodies. The first magnetic body and the second magnetic body may be formed by polarization of the magnetic body 232. Therefore, movement of the lens carrier 217 may be easily controlled.

At least one of the four magnetic bodies 232 may be used to provide position information of the lens carrier 217 to a position detector (for example, a hall sensor).

Alternatively, a position detection magnetic body 217a may be additionally disposed on the lens carrier 217 to enable detection of a position of the lens carrier 217. For example, the position detection magnetic body 217a may be disposed on a portion of an outer surface of the lens carrier 217 on which the coil 231 is not formed.

The lens module 210 may include first and second frames 215 and 219 supporting an exterior of the lens module 210, and may further include an elastic member supporting the movement of the lens carrier 217 in the optical axis direction. The elastic member may include a first elastic member 212 and/or a second elastic member 218. A hall sensor 216 for detecting a magnetic field of the magnetic body 217a for detection may be disposed on a first frame 215.

An image sensor module 250 and an actuator driving device 220 may be provided below the second frame 219. The image sensor module 250 and the actuator driving device 220 may be formed as an integrated circuit. A current from the actuator driving device 220 may be transferred to the coil 231 through suspension wires 214. To this end, an edge part 213 of the first elastic member 212 may include a wire coupling part 213a coupled to one end 214a of the suspension wire 214. The wire coupling part 213a may have a hole shape for receiving the end 214a of the wire 214.

The first actuator 230 may be operated in order to perform an auto-focusing (AF) function of the camera module 200 by moving the lens carrier 217 in the optical axis direction. In addition, the camera module 200 may further include a second actuator 270. The second actuator 270 may be operated in order to perform an optical image stabilization (OIS) function of the camera module 200. A coil may be disposed on an outer surface of the second actuator 270, and the coil disposed on the second actuator 270 may share the magnetic body 232 with the coil 231 disposed on the lens carrier 217, and may interact with the magnetic body 232 to move the lens carrier 217 in the perpendicular to the optical axis direction for the OIS function.

Figure 3:
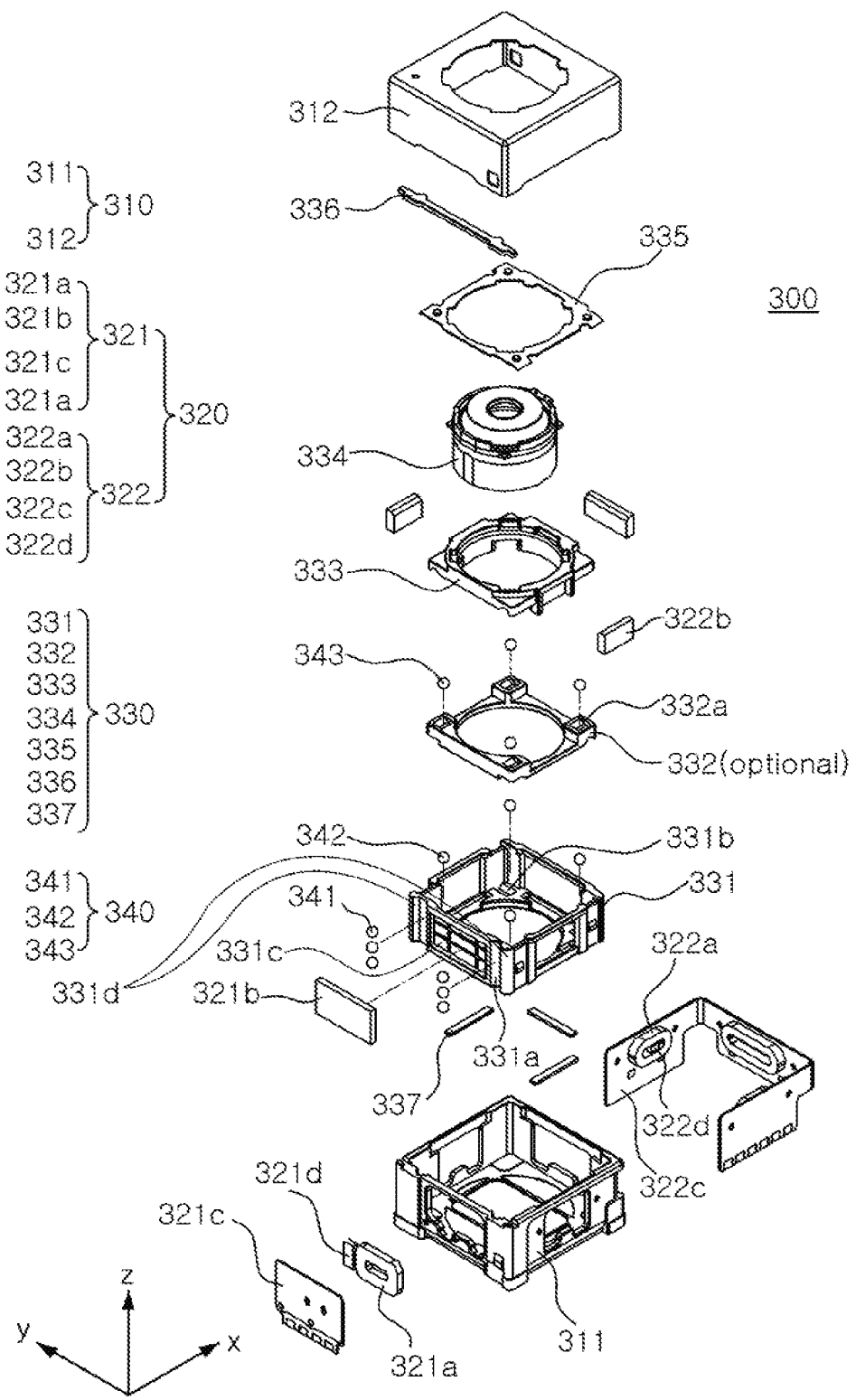
FIG. 3 is an exploded perspective view illustrating a camera module, according to another embodiment.

FIG. 3 is an exploded perspective view illustrating a camera module 300, according to an embodiment. Referring to FIG. 3, a camera module 300 includes a housing unit 310, an actuator 320, and a lens module 330.

The housing unit 310 may include a housing 311 and a shield case 312.

The housing 311 may be formed of a material that is easily molded. In an example, the housing 311 is formed of plastic. One or more actuators 320 may be mounted in the housing 311. Portions of a first actuator 321 may be mounted on a first side surface of the housing 311, and portions of a second actuator 322 may be mounted on second to fourth side surfaces of the housing 311. The housing 311 may be configured to accommodate the lens module 330 therein. For example, a space in which the lens module 330 is completely or partially accommodated is formed in the housing 311.

In addition, six surfaces of the housing 311 may be open. For example, a rectangular hole for an image sensor is formed in a bottom surface of the housing 311, and a square hole for mounting the lens module 330 described above is formed in a top surface of the housing 311. In addition, a hole into which a first coil 321a of the first actuator 321 may be inserted is formed in the first side surface of the housing 311, and holes into which second coils 322a of the second actuator 322 may be inserted are formed in the second to fourth side surfaces of the housing 311.

The shield case 312 may be configured to cover portions of the housing 311. For example, the shield case 312 may be configured to cover the top surface and four side surfaces of the housing 311. However, a shape of the shield case 312 is not limited to a shape covering all of the portions described above. For example, the shield case 312 may only be configured to cover the four side surfaces of the housing 311. Alternatively, the shield case 312 may be configured to partially cover the top surface and the four side surfaces of the housing 311.

The one or more actuators 320 may include a plurality of actuators. As an example, the actuators 320 may include the first actuator 321 configured to move the lens module 330 in a Z-axis direction and the second actuator 322 configured to move the lens module 330 in an X-axis direction and a Y-axis direction.

The first actuator 321 may be mounted on the housing 311 and a first frame 331 of the lens module 330. For example, portions of the first actuator 321 may be mounted on the first side surface of the housing 311, and the other portions of the first actuator 321 may be mounted on a first side surface of the first frame 331. The first actuator 321 may include one or more components configured to move the lens module 330 in the optical axis direction (the Z-axis direction of FIG. 3). As an example, the first actuator 321 may include the first coil 321a, a first magnetic body 321b, a first substrate 321c, and a first position detector 321d. The first coil 321a and the first position detector 321d may be formed on the first substrate 321c. The first substrate 321c may be mounted on the first side surface of the housing 311, and the first magnetic body 321b may be mounted on the first side surface of the first frame 331 facing the first substrate 321c.

The first actuator 321 configured as described above may supply a signal (for example, a current signal) to cause the first coil 321a to form an electric field, and the electric field may interact with a magnetic field of the first magnetic body 321b to generate driving force causing movement of the first frame 331 and a lens barrel 334 relative to the housing 311.

In addition, the first actuator 321 configured as described above may sense a strength of the magnetic field using the first magnetic body 321b by the first position detector 321d to detect a position of the first frame 331.

The first magnetic body 321b may be disposed on one surface 331c of the first frame 331, as illustrated in FIG. 3, or may be disposed on one of corners 331d of the first frame 331.

The second actuator 322 may be mounted on the housing 311 and a third frame 333 of the lens module 330. For example, portions of the second actuator 322 may be mounted on the second to fourth side surfaces of the housing 311, and the other portions of the second actuator 322 may be mounted on second to fourth side surfaces of the third frame 333. In another example, the second actuator 322 may be mounted on some of the first to fourth side surfaces of the housing 311 and the third frame 333, or may be mounted on corners at which the second to fourth side surfaces contact each other.

In addition, the second actuator 322 may include one or more components configured to move the lens module 330 in a direction perpendicular to the optical axis direction. The second actuator 322 may include a plurality of second coils 322a, a plurality of second magnetic bodies 322b, a second substrate 322c, and one or more second position detectors 322d. The plurality of second coils 322a and one or more second position detectors 322d may be formed on the second substrate 322c. The second substrate 322c may generally have a ' E' or C-bracket shape, and may be mounted to enclose the second to fourth side surfaces of the housing 311. The plurality of second magnetic bodies 322b may be mounted on the second to fourth side surfaces of the third frame 333, respectively, so as to face the second substrate 322c.

The second actuator 322 configured as described above may change a magnitude and a direction of magnetic force generated between the plurality of second coils 322a and the plurality of second magnetic bodies 322b to enable movement of a second frame 332 or the third frame 333 relative to the first frame 331.

For reference, the lens barrel 334 may move in the same direction as a moving direction of the second frame 332 or the third frame 333 due to the movement of the second frame 332 or the third frame 333. The second actuator 322 configured as described above may sense strength of the magnetic field by the second magnetic bodies 322b by the second position detectors 322d to detect a position of the second frame 332 or the third frame 333.

The lens module 330 may be mounted in the housing unit 310. For example, the lens module 330 may be accommodated in an internal accommodation space formed by the housing 311 and the shield case 312 so as to be movable in at least three axis directions.

The lens module 330 may include a plurality of frames. For example, the lens module 330 may include the first frame 331, the second frame 332, and the third frame 333.

The first frame 331 may be configured to be movable with respect to the housing 311. The first frame 331 may move in the optical axis direction (the Z-axis direction) of the housing 311 by the first actuator 321 described above. First and second guide grooves 331a and 331b may be formed in the first frame 331. The first guide grooves 331a may extend lengthwise in the optical axis direction (the Z-axis direction) and may be formed in the first side surface of the first frame 331. The second guide grooves 331b may extend lengthwise in a first direction (the Y-axis direction) perpendicular to the optical axis direction and may be formed in four corners of an inner bottom surface of the first frame 331, respectively. The first frame 331 may be manufactured so that at least three side surfaces of the first frame 331 are open. For example, second to fourth side surfaces of the first frame 331 may be open so that the second magnetic bodies 322b of the third frame 333 and the respective second coils 322a of the housing 311 may face each other.

The second frame 332 may be mounted in the first frame 331. For example, the second frame 332 may be mounted in an internal space of the first frame 331. The second frame 332 may be configured to move in the first direction (the Y-axis direction) perpendicular to the optical axis direction with respect to the first frame 331. For example, the second frame 332 may move in the first direction (the Y-axis direction) perpendicular to the optical axis direction along the second guide grooves 331b of the first frame 331. A plurality of guide grooves 332a may be formed in the second frame 332. For example, four third guide grooves 332a may extend lengthwise in a second direction (the X-axis direction) perpendicular to the optical axis direction may be formed in corners of the second frame 332.

The third frame 333 may be mounted on the second frame 332. In an example, the third frame 333 is mounted on a top surface of the second frame 332. The third frame 333 may be configured to move in the second direction (the X-axis direction) perpendicular to the optical axis direction with respect to the second frame 332. For example, the third frame 333 moves in the second direction (the X-axis direction) perpendicular to the optical axis direction along the third guide grooves 332a of the second frame 332. The plurality of second magnetic bodies 322b may be mounted on the third frame 333. In an example, at least two second magnetic bodies 322b are mounted on the second to fourth side surfaces of the third frame 333, respectively. Alternatively, three second magnetic bodies 322b may be mounted on the second to fourth side surfaces of the third frame 333, respectively.

In another example, the structure of the third frame 333 described above may be formed integrally with the second frame 332. In this case, the third frame 333 may be omitted, and the second frame 332 may move in the first direction (the Y-axis direction) and the second direction (the X-axis direction) perpendicular to the optical axis direction.

The lens module 330 may include the lens barrel 334. For example, the lens barrel 334 includes one or more lenses. The lens barrel 334 may be mounted in the third frame 333. For example, the lens barrel 334 is inserted into the third frame 333 to thereby move integrally with the third frame 333. The lens barrel 334 may be configured to move in the optical axis direction (the Z-axis direction) and directions (the X-axis and Y-axis directions) perpendicular to the optical axis direction. For example, the lens barrel 334 may be driven by the first actuator 321 to move in the optical axis direction (the Z-axis direction), and may be driven by the second actuator 322 to move in the directions (the X-axis and Y-axis directions) perpendicular to the optical axis direction.

As described above, the first actuator 321 may be operated to perform an auto-focusing (AF) function of the camera module 300 by moving the lens barrel 334 in the optical axis direction (the Z-axis direction), and the second actuator 322 may be operated to perform an optical image stabilization (OIS) function of the camera module 300 by moving the lens barrel 334 in the directions (the X-axis and Y-axis directions) perpendicular to the optical axis direction.

The lens module 330 may further include a cover member 335, a ball stopper 336, and magnetic bodies 337. The cover member 335 may be configured to prevent separation of the second frame 332 and the third frame 333 from the internal space of the first frame 331. For example, the cover member 335 is coupled to the first frame 331 to block the second frame 332 and the third frame 333 from escaping upward from the first frame 331.

The ball stopper 336 may be mounted on the first frame 331. For example, the ball stopper 336 is disposed to cover the first guide grooves 331a of the first frame 331 to block separation of first ball bearings 341, of a ball bearing part 340, mounted in the first guide grooves 331a.

The magnetic bodies 337 may be mounted on the first frame 331. For example, the magnetic bodies 337 are mounted on one or more of the second to fourth side surfaces of the first frame 331 to generate attraction force together with the second coils 322a and the second magnetic bodies 322b of the second actuator 322. The magnetic bodies 337 configured as described above may fix positions of the second frame 322 and the third frame 333 with respect to the first frame 331 in an inactive state of the actuator 320. For example, the lens module 330 is maintained at a predetermined position within the housing 311 by attraction force between the magnetic bodies 337 and the second coils 322a.

The ball bearing part 340 may be configured to provide smooth movement of the lens module 330. For example, the ball bearing part 340 may be configured so that the lens module 330 moves smoothly in the optical axis direction and the direction perpendicular to the optical axis direction. The ball bearing part 340 may include the first ball bearings 341, second ball bearings 342, and third ball bearings 343 distinguished from each other depending on their positions. As an example, the first ball bearings 341 are disposed in the first guide grooves 331a of the first frame 331 to allow the first frame 331 to move smoothly in the optical axis direction. As another example, the second ball bearings 342 are disposed in the second guide grooves 331b of the first frame 331 to allow the second frame 332 to move smoothly in the first direction perpendicular to the optical axis direction. As another example, the third ball bearings 343 are disposed in the third guide grooves 332a of the second frame 332 to allow the third frame 333 to move smoothly in the second direction perpendicular to the optical axis direction.

Each of the first and second ball bearings 341 and 342 may include at least three balls, and the at least three balls of each of the first and second ball bearings 341 and 342 may be disposed in the first and second guide grooves 331a and 331b, respectively. Alternatively, each of the first and second ball bearings 341 and 342 may include four balls, and the four balls of each of the first and second ball bearings 341 and 342 may be disposed in the first and second guide grooves 331a and 331b, respectively. However, the first and second ball bearings 341 and 342 may each include any number of ball bearings based on design and performance criteria.

For reference, although not illustrated, a lubricating material for reducing friction and noise may be filled in all portions in which the ball bearing part 340 is disposed. For example, a viscous fluid is injected into the respective guide grooves 331, 331b, and 332a. The viscous fluid may be a grease having excellent viscosity and lubricating characteristics.

Figure 4A:
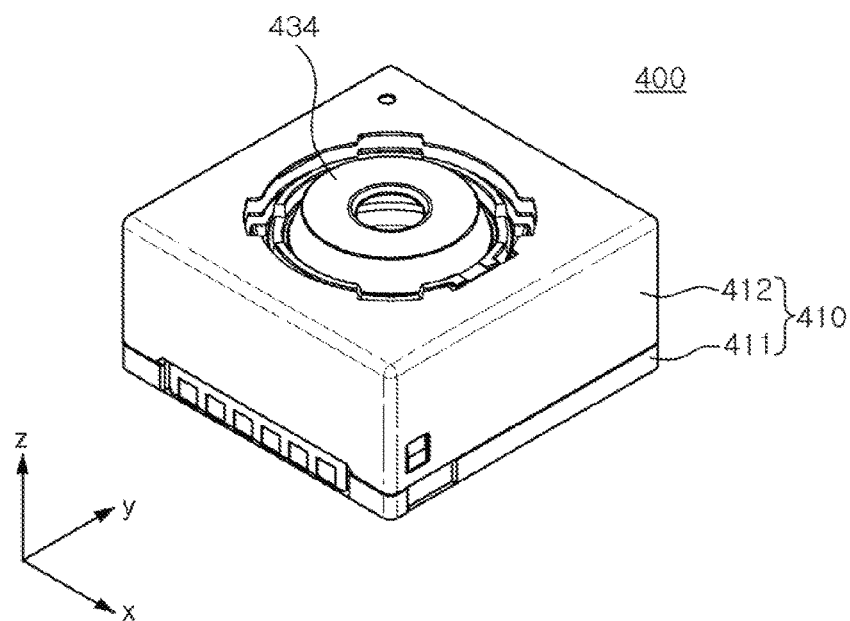
FIG. 4A is an assembled perspective view illustrating a camera module according to each the embodiments illustrated in FIGS. 1 through 3.

FIG. 4A is an assembled perspective view illustrating a camera module 400, according to any of the embodiments illustrated in FIGS. 1 through 3. The camera module 400 may have an auto-focusing (AF) function and an optical image stabilization (OIS) function. For example, a lens barrel 434 may move in each of the optical axis direction and the directions perpendicular to the optical axis direction within a housing unit 410. Therefore, the camera module 400 may be easily miniaturized and thinned.

Although not illustrated in FIG. 4A, an actuator driving device for controlling an actuator may be included in the camera module 400. The actuator driving device may be implemented as a portion of a driver integrated circuit (IC), and may output a signal for driving the actuator depending on a command from an application integrated circuit (IC) mounted in an electronic apparatus including the camera module 400.

Figures 4B, 4C:
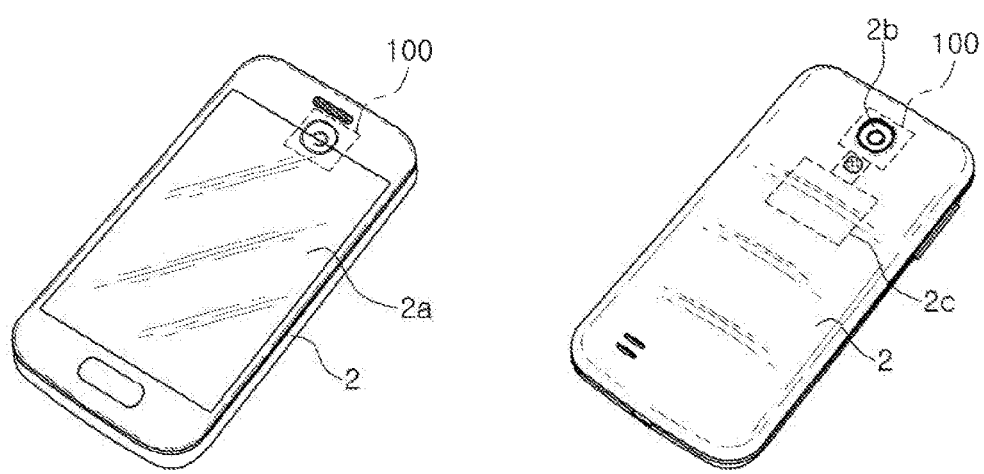
FIGS. 4B and 4C are schematic views illustrating an exterior of an electronic apparatus including a camera module, according to an embodiment.

FIGS. 4B and 4C are schematic views illustrating an exterior of an electronic apparatus 2 including a camera module 100, 200, 300/or 400, according to an embodiment. A lens of the camera module 100, 200, 300 or 400 may be open to the outside of the electronic apparatus 2 through an opening part 2b of the electronic apparatus 2 to image an external object. The camera module 100, 200, 300 or 400 may be electrically connected to an application IC 2c of the electronic apparatus 2 to perform a control operation depending on selection of a user.

Figure 5:
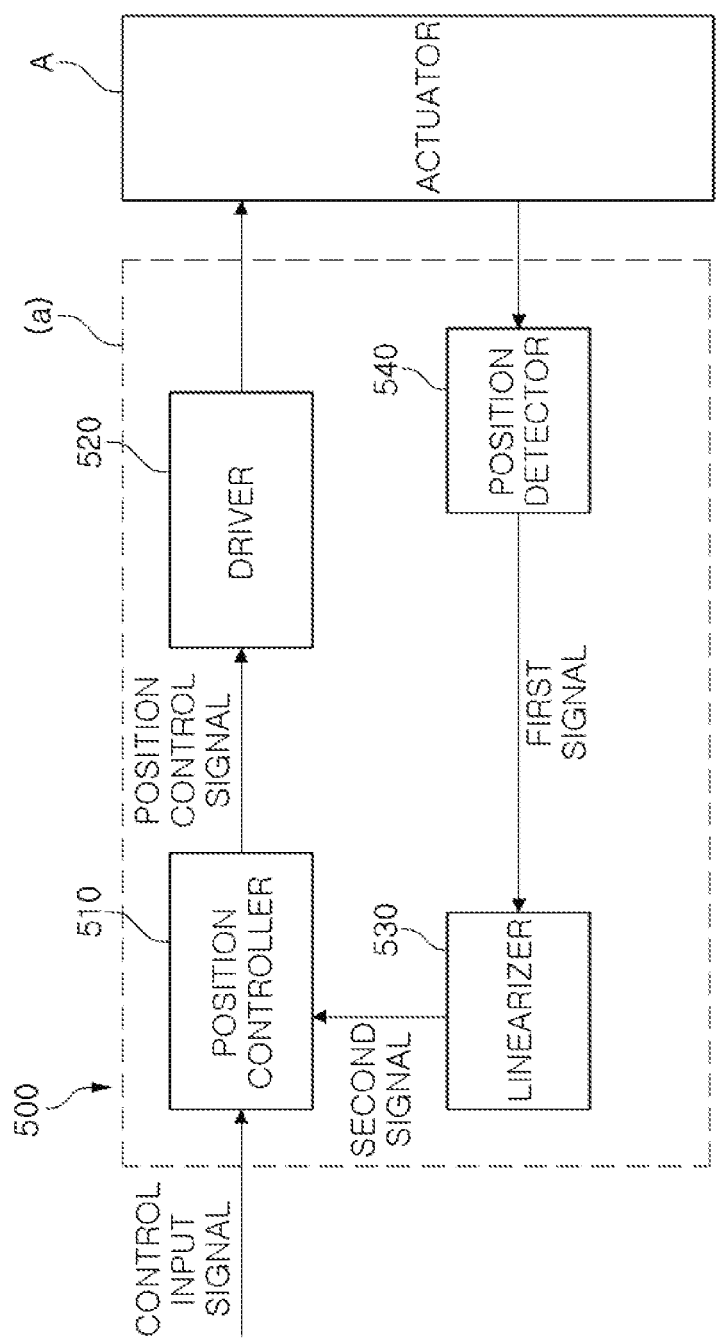
FIG. 5 is a block diagram illustrating an actuator driving device, according to an embodiment.

FIG. 5 is a block diagram illustrating an actuator driving device, according to an embodiment. Referring to FIG. 5, the actuator driving device 500 may include a position controller 510, a driver 520, a linearizer 530, and a position detector 540. As illustrated by the dotted line (a), the position controller 510, the driver 520, the linearizer 530, and the position detector 540 may constitute one integrated circuit. Alternatively, the position controller 510, the driver 520, the linearizer 530, and the position detector 540 may constitute two or more integrated circuits.

However, the actuator driving device 500 is not limited to including the components described above. For example, the actuator driving device 500 may include only the position controller 510, the driver 520, and the linearizer 530, and may receive a detection signal (hereinafter, referred to as a first signal) corresponding to displacement of a lens module from a position detector 540 separately provided outside the actuator driving device 500.

The one integrated circuit may be implemented by combining hardware such as a microprocessor, or the like, and software provided in the hardware and programmed to perform a predetermined operation. The hardware may include at least one processor. The processor may include, for example, a central processing unit (CPU), a microprocessor, an application specific integrated circuit (ASIC), a field programmable gate array (FPGA), or the like, and may have a plurality of cores.

Hereinafter, operations of the actuator driving device, according to an embodiment, will be sequentially described depending on a flow of signals from the position detector 540 detecting movement or displacement of the lens module.

The displacement of the lens module refers to a distance by which the lens module is moved, by an actuator A driven by the actuator driving device 500, in relation to a case in which the lens module is positioned at a preset default position due to initialization of the actuator driving device 500.

The position detector 540 may output the first signal corresponding to the displacement of the lens module. In detail, the position detector 540 may sense a strength of a magnetic field produced by a magnetic body disposed in the lens module to detect the displacement of the lens module. For example, the position detector 540 is a hall sensor.

The actuator driving device 500 drives the actuator A, whereby the displacement of the lens module may be output as the first signal by the position detector 540. Before an operation of the linearizer 530 is described in detail, the reason that the first signal output by the position detector 540 has non-linearity (varies non-linearly) with respect to the displacement of the lens module will be described with reference to FIGS. 7A and 7B.

Figure 7A:
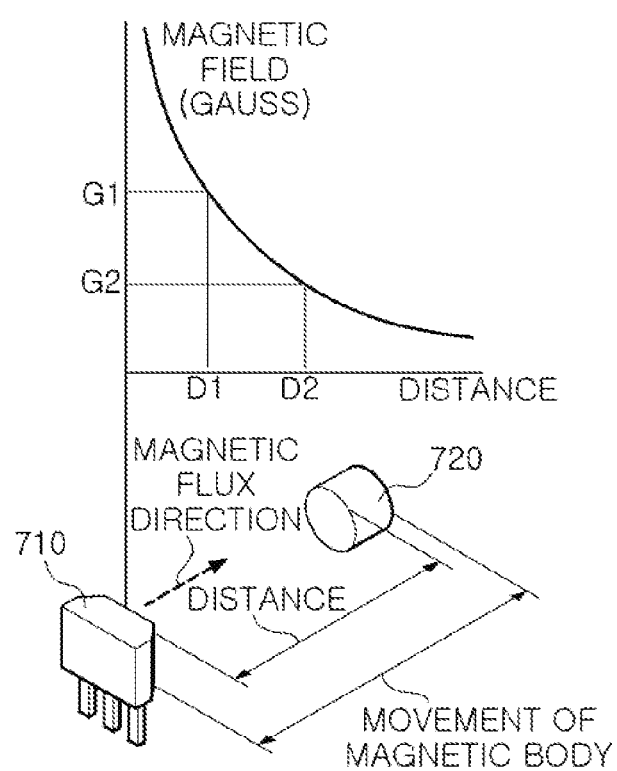
FIGS. 7A and 7B are views illustrating strength of a magnetic field of which a degree of change depending on distance has non-linearity.
Figure 7B:
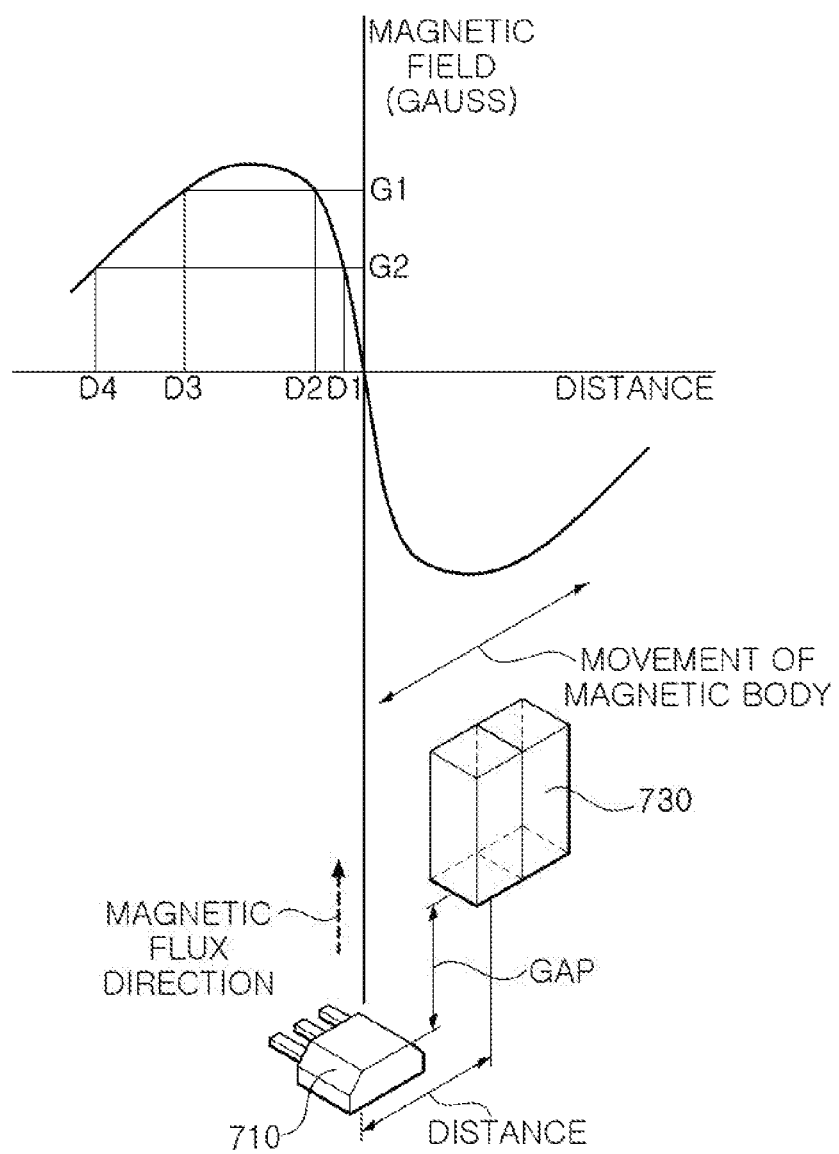

FIGS. 7A and 7B are views illustrating a strength of a magnetic field sensed by a sensor 710, depending on a distance between the sensor 710 and a magnetic body 720 or 730.

FIG. 7A illustrates a unipolar head-on mode scheme in which the magnetic body 720 is a unipolar magnetic body that generates a change in strength of a magnetic field and moves linearly in a vertical direction of a hall sensor, and. FIG. 7B illustrates a bipolar slide-by mode scheme in which the magnetic body 730 is a magnetic body formed by polarization and moves linearly in a horizontal direction of a hall sensor.

The position detector 710 may be the hall sensor as described above. The hall sensor 710 detects the displacement of the lens module by sensing a magnetic field irradiated by the magnetic body 720 or 730.

However, as illustrated in FIGS. 7A and 7B, the strength of a magnetic field in the hall sensor 710 does not have a linear relationship with a distance between the hall sensor 710 and the magnetic body 720 or 730. In addition, the first signal (see FIG. 4) is determined by the strength of the magnetic field sensed in the hall sensor 710. On the contrary, the distance between the hall sensor 710 and the magnetic body 720 or 730 has linearity (varies linearly) with respect to the actual displacement of the lens module. Therefore, the first signal output by the hall sensor 710 has non-linearity (varies non-linearly) with respect to the actual displacement of the lens module.

Again referring to FIG. 5, the linearizer 530 may linearize the first signal corresponding to the displacement of the lens module to provide a second signal. That is, the linearizer 530 may convert the first signal output from the position detector 540 into the second signal having linearity with respect to actual displacement of the lens module, and may output the second signal.

The second signal may be input to the position controller 510 to thereby be used for the position controller 510 to correct a control input signal. For example, the position controller 510 may output a position control signal by correcting the control input signal or output the position control signal in response to the control input signal. The second signal may be used when the position controller 510 outputs the position control signal depending on the control input signal.

According to an embodiment, the linearizer 530 may linearize the first signal using a preset correction parameter. For example, the linearizer 530 linearizes the first signal by adding or subtracting the correction parameter to or from the first signal. That is, the second signal output by the linearizer 530 may be a signal obtained by adding or subtracting the correction parameter to or from the first signal output by the position detector 540. In another embodiment, the correction parameter may be a dynamically provided parameter rather than a preset parameter.

The correction parameter may be set so that the first signal has a value corresponding to the actual displacement of the lens module. That is, the correction parameter may be set on the basis of a difference between a magnitude of a signal corresponding to the actual displacement of the lens module and a magnitude of the first signal. Hereinafter, examples of calculating the correction parameters will be described with reference to FIGS. 8A and 8B.

Figure 8A:
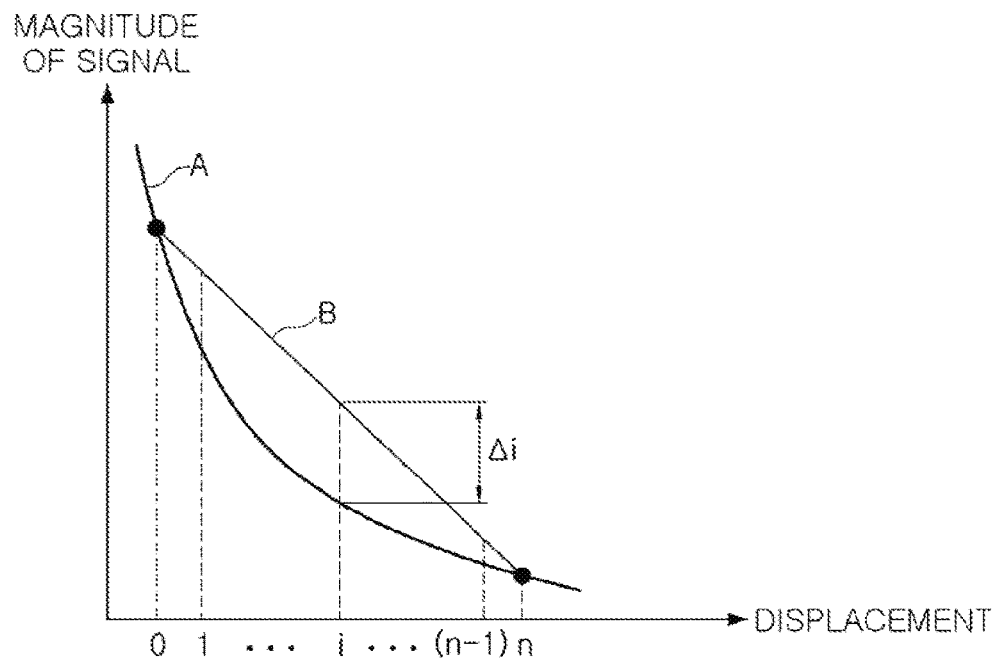
FIGS. 8A and 8B are graphs illustrating examples of calculating correction parameters for correcting a detection signal corresponding to displacement of a lens module into actual displacement of the lens module.
Figure 8B:
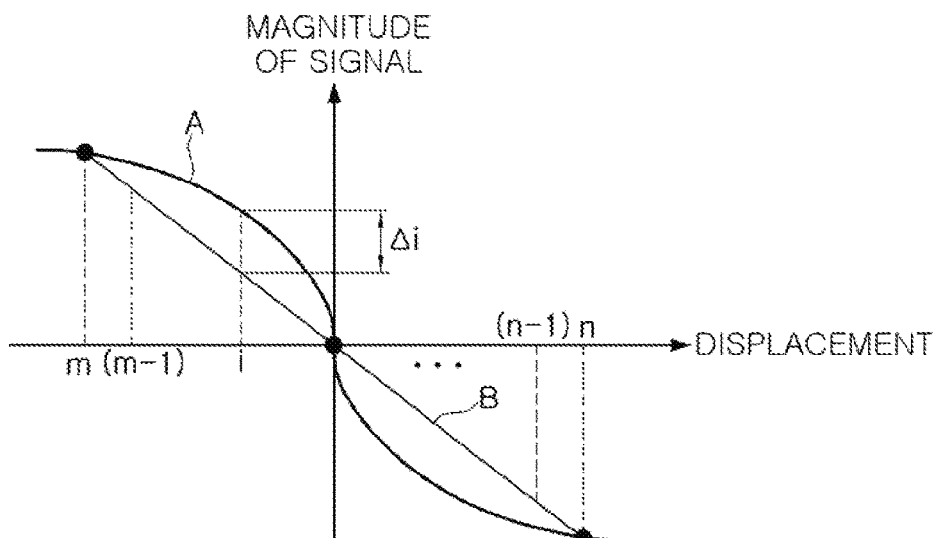

FIG. 8A is a graph illustrating an example of calculating a correction parameter in the unipolar head-on mode scheme, and FIG. 8B is a graph illustrating an example of calculating a correction parameter in the bipolar slide-by mode scheme. In FIGS. 8A and 8B, an x axis refers to actual displacement of the lens module, a y axis refers to magnitudes of signals (a first signal and an ideal signal), A refers to the first signal output from the position detector 540 (see FIG. 5), and B refers to an ideal signal depending on the actual displacement of the lens module, that is, a signal having linearity with respect to the actual displacement of the lens module.

As described above, the actuator driving device 500 (see FIG. 5) according to an exemplary embodiment in the present disclosure may linearize the first signal (see FIG. 5) varied depending on the movement of the lens module. To this end, the actuator driving device 500, according to an embodiment, may set correction parameters for correcting the first signal (see FIG. 5) into the second signal (see FIG. 5) having the linearity with respect to the actual displacement of the lens module.

Referring to FIG. 8A, the position detector 540 (see FIG. 5) (for example, a hall sensor) may output the first signal depending on the movement of the lens module in a section (a rated stroke section) in which a movement range of the lens module with respect to the housing unit is restricted.

Since the first signal has the non-linearity with respect to the actual displacement of the lens module, a correction parameter Δi for a code value i may be calculated in order to correct the first signal into the ideal signal. For example, the correction parameter Δi may be a magnitude difference between the ideal signal corresponding to the actual displacement of the lens module and the first signal. That is, the correction parameter Δi may be set by comparing the first signal and the ideal signal corresponding to the actual displacement of the lens module with each other.

The code value i refers to position information indicating target displacement of the lens module, and the first signal corresponding to the code value i may be sampled. In addition, the actual displacement of the lens module may be measured and obtained by a laser sensor measuring method. In addition, the ideal signal corresponding to the actual displacement of the lens module may be a value preset to have linearity with respect to the actual displacement of the lens module in the rated stroke section. A maximum value of the ideal signal corresponding to the actual displacement of the lens module may be the same as a magnitude of the first signal when displacement of the lens module is the smallest value in the rated stroke section, a minimum value of the ideal signal corresponding to the actual displacement of the lens module may be the same as a magnitude of the first signal when displacement of the lens module is the largest value in the rated stroke section, and other values of the ideal signal corresponding to the actual displacement of the lens module may be values that are linearly reduced depending on the actual displacement of the lens module between the maximum value and the minimum value.

Correction parameters for respective code values (0 to n) may be calculated while varying the actual displacement of the lens module.

For example, the control input signal input to the actuator driving device 500 (see FIG. 5) includes position information indicating a target position to which the user wants to move the lens module, that is, target displacement of the lens module. The position information may be a code value of 0 or more to n or less. When the position information included in the control input signal is varied, the lens module may move depending on the position information, that is, the code values (0 to n). Therefore, the first signal may also be varied. Therefore, when the first signal is sampled while varying the position information included in the control input signal, the first signal corresponding to each code value (that is, the position information) may be sampled. In each point in time in which the first signal is sampled, the actual displacement of the lens module is measured, and a value of the ideal signal corresponding to the measured actual displacement of the lens module and a value of the first signal that is sampled are compared with each other, whereby the correction parameters may be calculated.

Since FIG. 8B may be understood from the description for FIG. 8A, a detailed description of FIG. 8B will be omitted.

Again referring to FIG. 5, the linearizer 530 may generate an intermediate parameter using the correction parameter, and linearize the first signal using the intermediate parameter and the correction parameter. For example, the linearizer 530 linearizes the first signal by adding or subtracting the intermediate parameter or the correction parameter to or from the first signal. That is, the linearizer 530 may add or subtract the correction parameter to or from the first signal or add or subtract the intermediate parameter to or from the first signal, depending on a value of the first signal. The intermediate parameter may be calculated by interpolation of the correction parameter.

In addition, the linearizer 530 may linearize the first signal using a preset correction function. The correction function may be a function in which an offset and a curvature for approximating the first signal to a signal having linearity with respect to the displacement of the lens module are reflected. That is, the correction function may include the first signal as an input variable, include an offset for approximating the correction parameters as a constant, and include a curvature for approximating the correction parameter as a coefficient. Here, the constant and the coefficient may be set by measuring the actual displacement of the lens module and comparing a value of the ideal signal corresponding to the measured actual displacement of the lens module and a value of the first signal with each other.

The position controller 510 may generate the position control signal in response to the second signal output by the linearizer 530 and the control input signal, and provide the position control signal to the driver 520.

The driver 520 may output a signal for driving the actuator A depending on the position control signal. For example, the signal output by the driver 520 may be a current signal, and the driver 520 may be an H bridge driver that may be bi-directionally driven.

Figure 6:
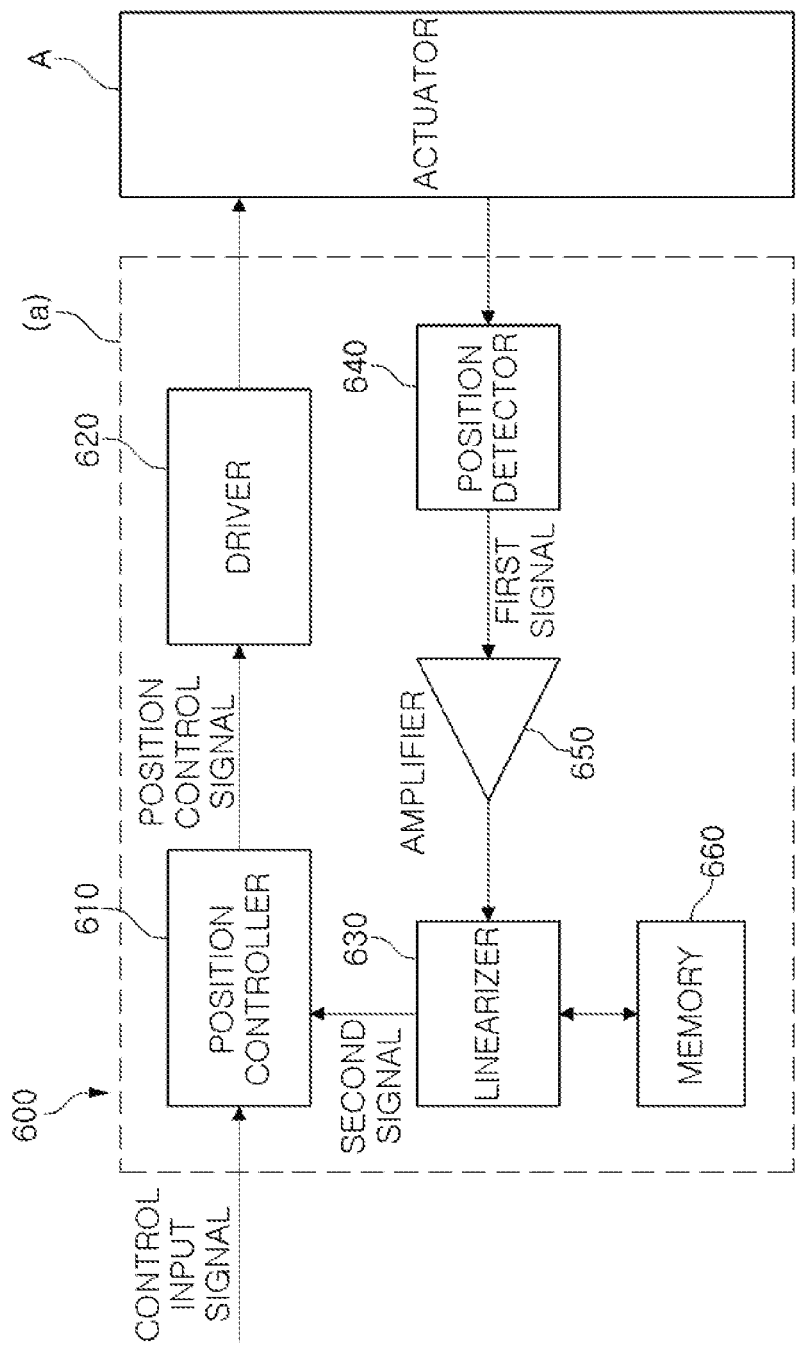
FIG. 6 is a block diagram illustrating an actuator driving device, according to another embodiment.

FIG. 6 is a block diagram illustrating an actuator driving device 600, according to another embodiment. Referring to FIG. 6, the actuator driving device 600 may include a position controller 610, a driver 620, and a linearizer 630, and may further include a position detector 640, an amplifier 650, and a memory 660. As illustrated by the dotted line (a), the position controller 610, the driver 620, and the linearizer 630 may constitute one integrated circuit. In addition, the position detector 640, the amplifier 650, and the memory 660 may be included in the one integrated circuit. Alternatively, the actuator driving device 600 may receive a first signal from a position detector 640 disposed outside the one integrated circuit.

As described above with reference to FIG. 5, the linearizer 630 may linearize the first signal using a preset correction parameter. To this end, the linearizer 630 may linearize the first signal using the correction parameter stored in the memory 660.

The memory 660 may be a non-volatile memory. The non-volatile memory may be a flash memory, an electrically erasable programmable read-only memory (EEPROM), or a ferroelectric random access memory (FeRAM). The FeRAM may be used as the memory 660 in order to increase an operation speed of the actuator driving device 500. In this case, read and write periods of the FeRAM may be several tens of microseconds (μs), and FeRAM may have a short delay.

The memory 660 may store the correction parameters and information required for driving the actuator A therein, and may provide the stored information on demand.

In addition, the first signal may be amplified by the amplifier 650 and be then provided to the linearizer 630.

Since further operations of the position controller 610, the driver 620, the linearizer 630, and the position detector 640 other than the operations described above are the same as those of the position controller 510, the driver 520, the linearizer 530, and the position detector 540 of the actuator driving device 500 of FIG. 5, a detailed description of such further operations of will be omitted.

Figure 9A:
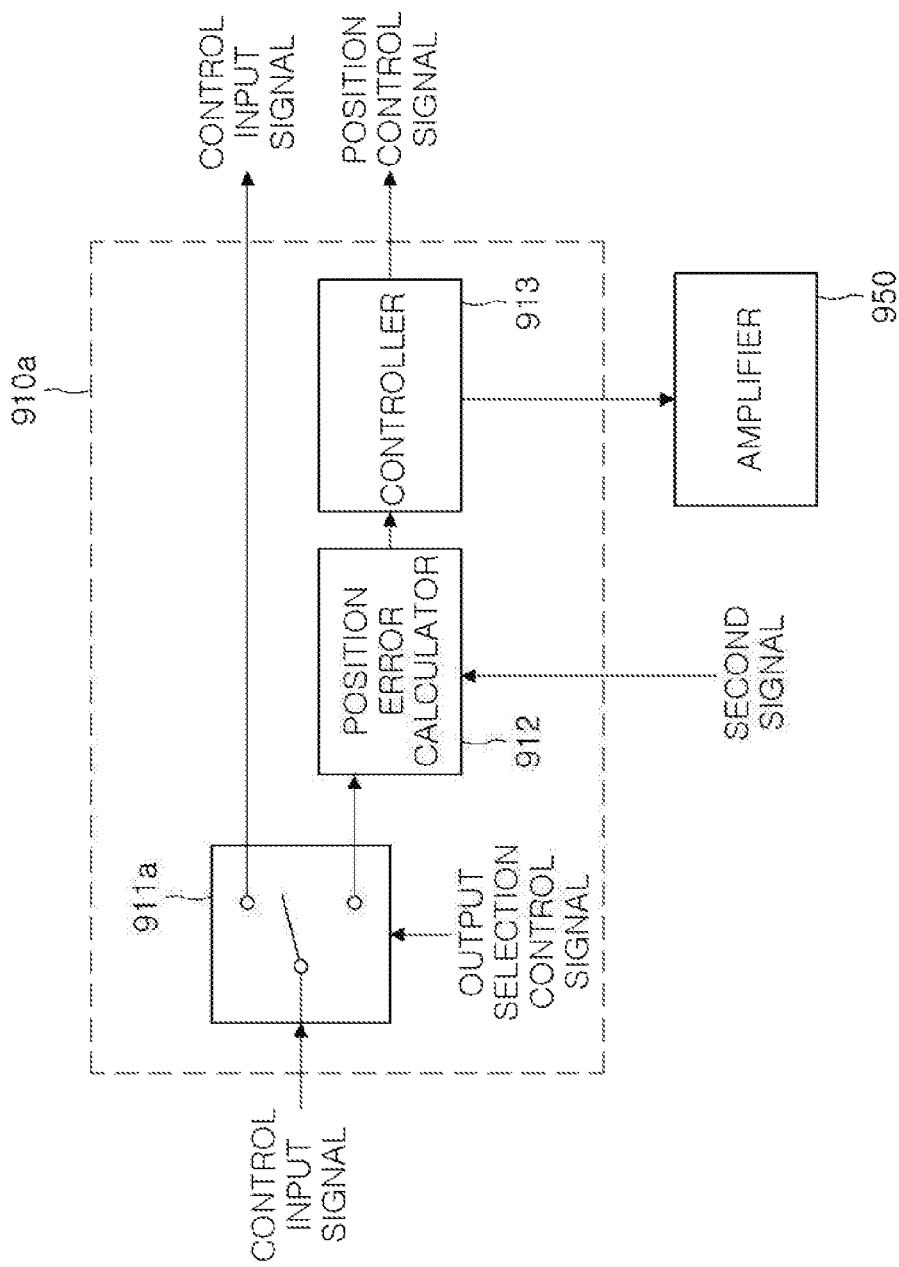
FIGS. 9A through 9D are block diagrams illustrating position controllers included in actuator driving devices, according to various embodiments.
Figure 9B:
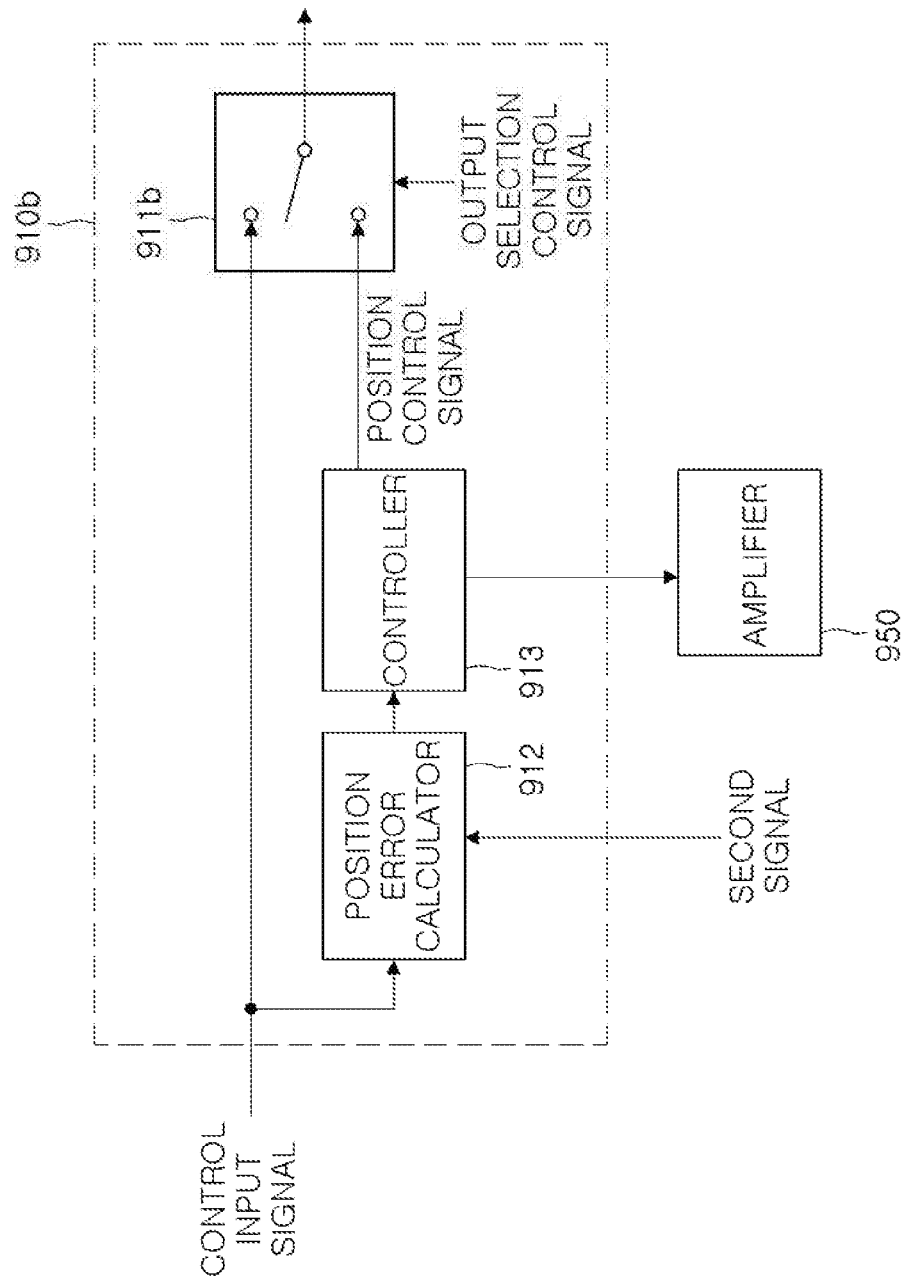

FIGS. 9A through 9D are block diagrams illustrating position controllers 910a and 910b included in actuator driving devices according to various embodiments. Referring to FIGS. 9A and 9B, the position controller 910a or 910b included in an actuator driving device may include a position error calculator 912 and a controller 913.

In addition, the position controller 910a or 910b may further include a switch 911a or 911b, respectively. Here, the switch 911a or 911b may select one of a control input signal and a position control signal depending on an output selection control signal, and may output the selected signal to the driver.

FIG. 9A illustrates a case in which the position controller 910a includes the switch 911a and the switch 911a selects a transfer path of the control input signal depending on the output selection control signal and outputs the control input signal to the driver 520 (see FIG. 5) or transfers the control input signal to the position error calculator 912. FIG. 9B illustrates a case in which the switch 911b outputs the control input signal to the driver 520 (see FIG. 5) or transfers the position control signal to the driver 520 (see FIG. 5) depending on the output selection control signal. As can be appreciated from the illustrations in FIGS. 9A and 9B, the switch 911a of the position controller 910a is located upstream from the position error calculator 912 and the controller 913, whereas the switch 911b of the position controller 910b is located downstream from the position error calculator 912 and the controller 913.

The output selection control signal may be a signal input generated outside of the position controller 910a or 910b and transmitted to the position controller 910a or 910b in order to select the transfer path of the control input signal or a signal generated from the control input signal.

The position error calculator 912 may calculate error information between position information included in the control input signal and position information based on the second signal output by the linearizer 530 (see FIG. 5). The position information included in the control input signal may be a position of the lens module desired by the user, that is, displacement of the lens module desired by the user, and the position information based on the second signal may be a current position of the lens module, that is, current displacement of the lens module. Therefore, the error information may be a difference between the position of the lens module desired by the user and the current position of the lens module.

The controller 913 may generate the position control signal depending on the calculated error information. In an example, the controller 913 is a proportional-integral-derivative (PID) controller. That is, the controller 913 may output the position control signal for moving the lens module from a current position to a position corresponding to the position information included in the control input signal. The driver 520 (see FIG. 5) may drive the actuator A (see FIG. 5) in response to the position control signal.

In addition, the controller 913 may control an amplification factor of an amplifier 950 (corresponding to the amplifier 650 of FIG. 6) included in the actuator driving device 600 to amplify the first signal received from the position detector 640, according to another embodiment.

Figure 9C:
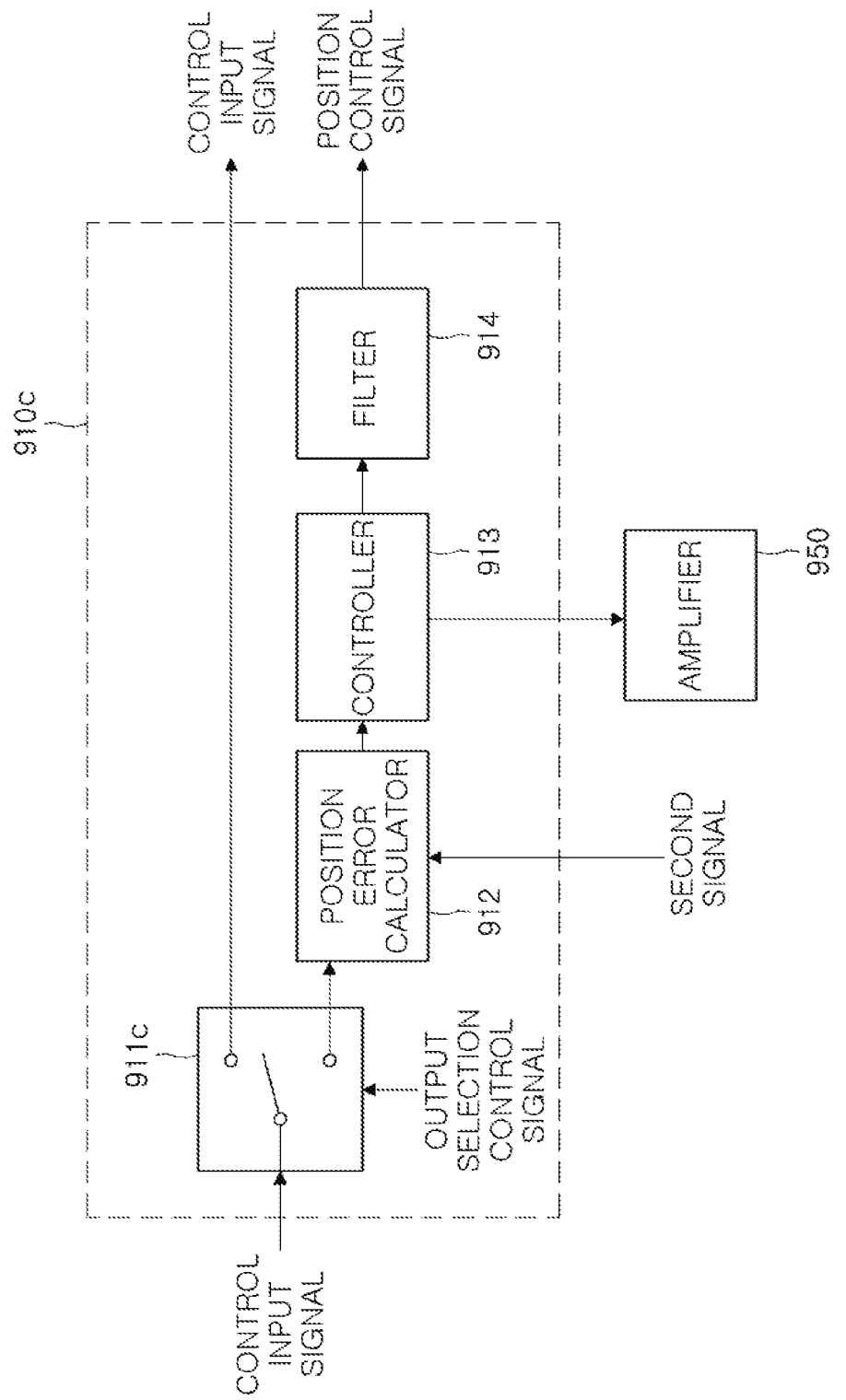
Figure 9D:
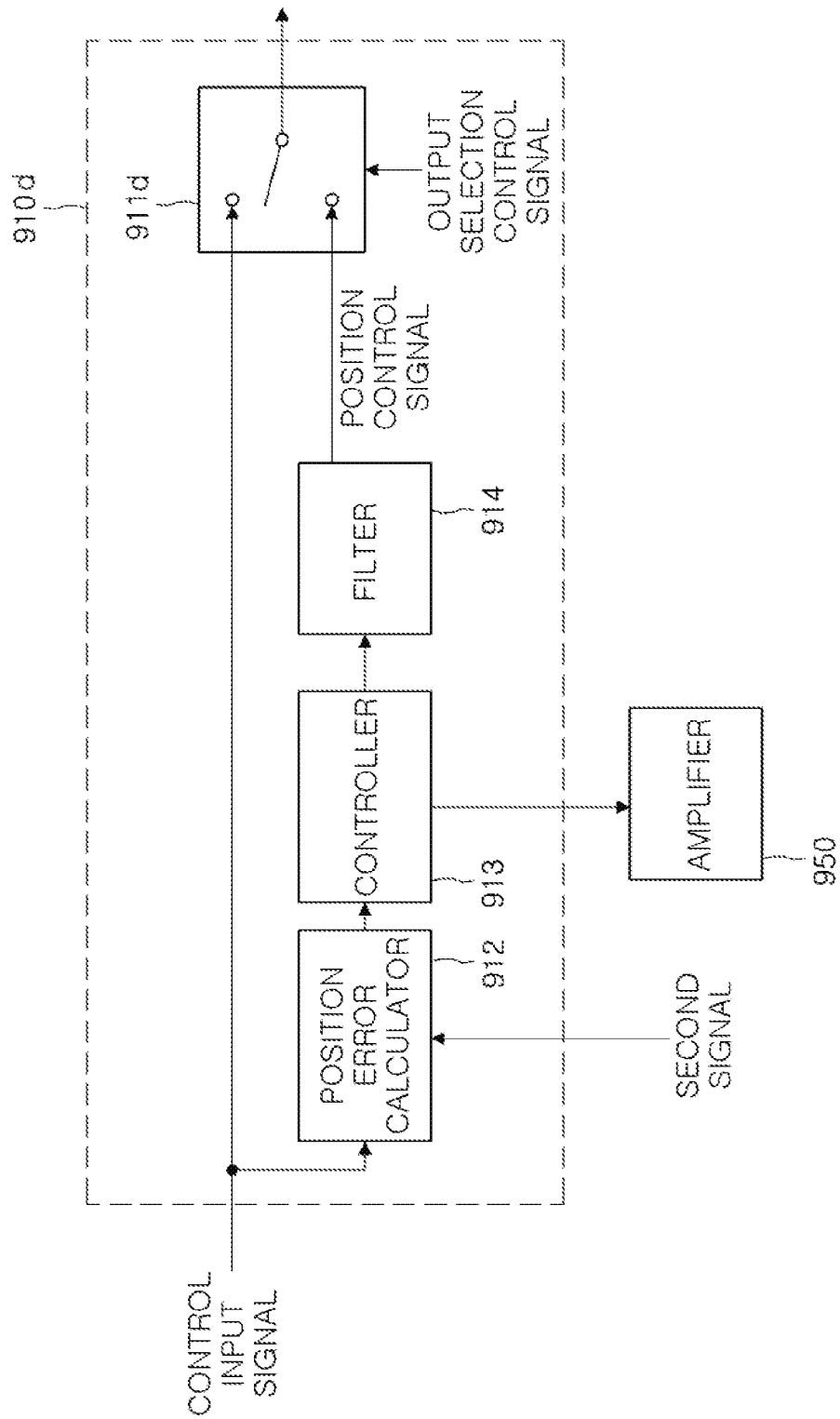

Referring to FIGS. 9C and 9D, according to example embodiments, a position controller 910c or 910d, respectively, included in an actuator driving device may include switches 911c or 911D, respectively, and a filter 914, as compared to the position controller 910a or 910b included in the actuator driving device described with reference to FIGS. 9A and 9B. The filter 914 may filter the signal output by the controller 913 to output the position control signal.

As can be appreciated from the illustrations in FIGS. 9C and 9D, the switch 911c of the position controller 910c is located upstream from the position error calculator 912, the controller 913 and the filter 914, whereas the switch 911d of the position controller 910d is located downstream from the position error calculator 912, the controller 913 and the filter 914. Since further operations of the switch 911c or 911d, the error calculator 912, and the controller 913 other than the operations described above are the same as those of the position controller included in the actuator driving device according to the embodiment described above with reference to FIGS. 9A and 9B, a detailed description of such further operations will be omitted.

Figure 10:
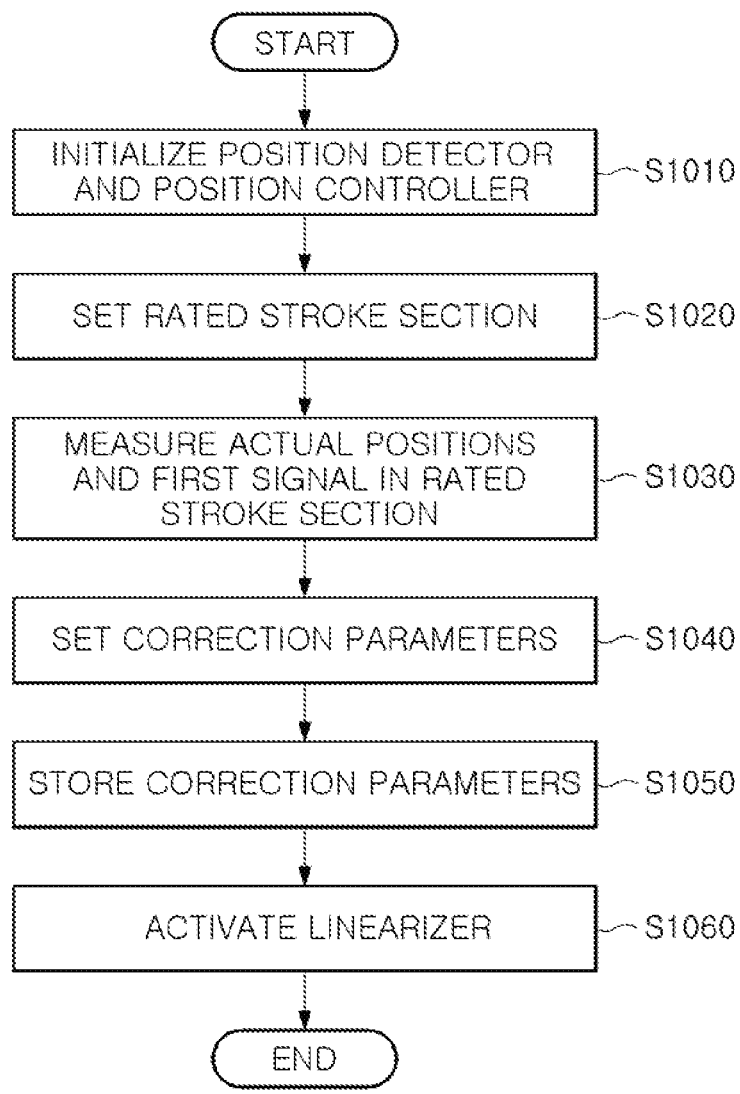
FIG. 10 is a flow chart illustrating a process of setting correction parameters to linearize a position detection signal, according to an embodiment.

FIG. 10 is a flow chart illustrating a process of setting correction parameters to linearize a position detection signal, according to an embodiment. Referring to FIG. 10, the process of linearizing the detection signal (that is, the first signal (see FIG. 5) obtained by detecting the displacement of the lens module begins by initializing the position detector and the position controller in operation S1010. Then, the section (the rated stroke section), in which a range in which the lens module is moved with respect to the housing unit is restricted, may be set in operation S1020. The actual positions of the lens module and the first signal may be measured in the set section (the rated stroke section) in operation S1030, and the correction parameters for correcting the first signal into the actual displacements may be set in operation S1040. In performing operations S1030 and S1040, the linearizer 530 (see FIG. 5) may be inactivated.

Next, in operation S1050, the correction parameters may be stored to enable the linearizer 530 (see FIG. 5), which is activated later, to use the correction parameters in order to correct the first signal. The linearizer may be activated in operation S1060.

Figure 11:
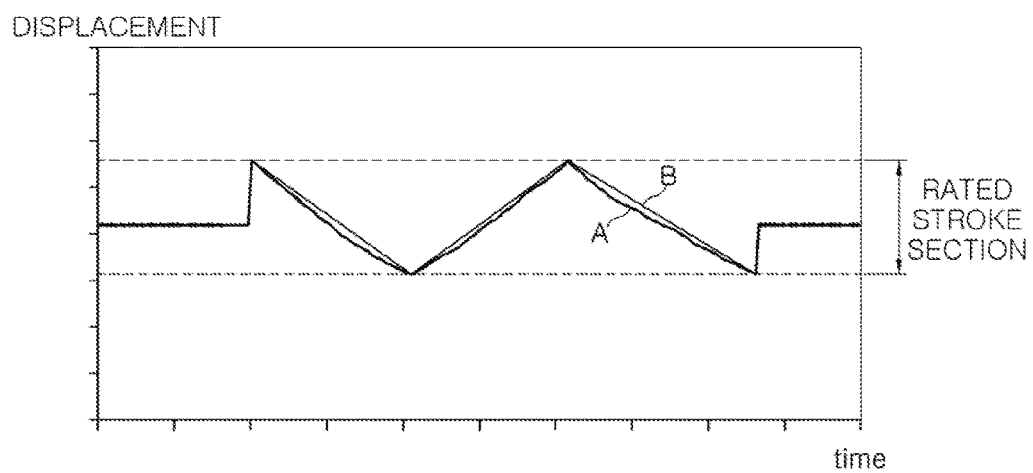
FIG. 11 is an output simulation result of a test process to which the process of linearizing a detection signal, according to an embodiment, is applied.

FIG. 11 is an output simulation result of a test process to which a process of linearizing a detection signal, according to an embodiment, is applied. Referring to FIG. 11, a displacement graph of the lens module depending on the movement of the lens module within the rated stroke section may be confirmed.

In addition, it may be confirmed that a displacement graph B of the lens module to which the process of linearizing the detection signal (the first signal (see FIG. 5)) is applied is linear, as compared to a non-linear displacement graph A of the lens module to which the process of linearizing the detection signal is not applied.

As set forth above, a actuator driving device and a camera module including the actuator driving device, according to embodiments disclosed herein, may enable an actuator of the camera module to be accurately driven by linearizing a non-linear detection signal corresponding to displacement of a lens module of the camera module.

The apparatuses, units, modules, devices, and other components illustrated in FIGS. 5, 6 and 9A-9D (e.g., the actuator driving devices 500 and 600, the position controllers 510, 610, 910a and 910b, the drivers 520 and 620, the linearizers 530 and 630, the position detectors 540 and 640, the amplifiers 650 and 950, the memory 660, the switches 911a-911d, the position error calculator 912, the controller 913 and the filter 914) that perform the operations described herein with respect to FIGS. 1-3, 5-7B, 9A-9D and 10 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-3, 5-7B, 9A-9D and 10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 10 that perform the operations described herein with respect to FIGS. 1-3, 5-7B, 9A-9D and 10 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. An actuator driving device, comprising:
   a linearizer configured to linearize a first signal, indicative of a displacement of a lens module, to generate a second signal;
   a position controller configured to generate a position control signal in response to the second signal and a control input signal indicative of a target location of the lens module; and
   a driver configured to drive an actuator in response to the position control signal,
   wherein the linearizer is further configured to linearize the first signal based on a correction parameter set by comparing the first signal with a signal having a linearity with respect to the displacement of the lens module.
2. The actuator driving device of claim 1, wherein the linearizer is further configured to generate an intermediate parameter by interpolation based on the correction parameter, and to linearize the first signal using the intermediate parameter and the correction parameter.

3. The actuator driving device of claim 1, wherein the linearizer is further configured to linearize the first signal using a correction function.

4. The actuator driving device of claim 3, wherein the correction function reflects an offset to approximate the first signal to the signal having linearity with respect to the displacement of the lens module, and reflects a curvature.

5. The actuator driving device of claim 1, further comprising a position detector configured to:
sense a strength of a magnetic field, produced by a magnetic body disposed in the lens module, to detect the displacement of the lens module; and
provide the first signal based on the sensed strength of the magnetic field.

6. The actuator driving device of claim 1, wherein the position controller comprises:
a position error calculator configured to calculate error information between the control input signal and the second signal; and
a controller configured to provide the position control signal depending on the error information.

7. The actuator driving device of claim 6, wherein the position controller further comprises a switch configured to:
select one of the control input signal and the position control signal depending on an output selection control signal; and
output the selected signal to the driver.

8. A camera module, comprising:
an actuator configured to move a lens module;
a position detector configured to detect a displacement of the lens module and to generate a first signal based on the detected displacement of the lens module;
a linearizer configured to linearize the first signal, using a correction parameter, to produce a second signal;
a position controller configured to generate a position control signal in response to the second signal and a control input signal indicative of a target location of the lens module; and
a driver configured to drive the actuator based on the position control signal,
wherein the correction parameter is set by comparing the first signal with a signal having linearity with respect to the displacement of the lens module.

9. The camera module of claim 8, wherein the linearizer is further configured to linearize an intermediate parameter by interpolation based on the correction parameter, and to linearize the first signal using the intermediate parameter and the correction parameter.

10. The camera module of claim 8, wherein the linearizer is further configured to linearize the first signal using a correction function.

11. The camera module of claim 10, wherein the correction function is a function reflecting an offset for approximating the first signal to the signal having linearity with respect to the displacement of the lens module, and reflecting a curvature.

12. The camera module of claim 8, wherein the position controller comprises:
a position error calculator configured to calculate error information between the control input signal and the second signal;
a controller configured to generate the position control signal by correcting the control input signal using the error information; and a switch configured to select one of the control input signal and the position control signal based on an output selection control signal, and to output the selected signal to the driver.

13. An apparatus, comprising:
a linearizer configured to
linearize a first signal indicative of a displacement of a lens module, using a correction parameter, to generate a second signal, and
transmit the second signal to a position controller to generate a position control signal to drive an actuator to move the lens module,
wherein the correction parameter is set by comparing the first signal with a signal having linearity with respect to the displacement of the lens module.

14. The apparatus of claim 13, wherein the linearizer is further configured to generate an intermediate parameter by interpolation based on the correction parameter, and to linearize the first signal using the intermediate parameter and the correction parameter.

15. The apparatus of claim 13, wherein the linearizer is further configured to linearize the first signal using a correction function, and the correction function reflects an offset to approximate the first signal to the signal having linearity with respect to the displacement of the lens module, and reflects a curvature.

16. A method to set correction parameters in a lens module, comprising:
measuring actual positions of the lens module within a rated stroke section;
setting the correction parameters to correct a position detection signal, generated by a position detector, into the actual positions; and,
generating intermediate parameters by interpolation based on the correction parameters, and
activating a linearizer to linearize the position detection signal using the intermediate parameters and the correction parameters.

17. The method of claim 4, wherein the position detection signal is generated based on sensing a strength of a magnetic field produced by a magnetic body disposed in the lens module.

18. A method to operate an actuator, comprising:
sensing, using a position detector, a strength of a magnetic field produced by a magnetic body disposed in a lens module, to detect a displacement of the lens module;
generating, using the position detector, a first signal indicative of the detected displacement;
generating, using a linearizer, a second signal, by applying a correction parameter to linearize the first signal;
receiving a control input signal indicative of a target location of the lens module; and
in response to the second signal and the control input signal, generating, using a position controller, a position control signal to drive the actuator,
wherein the correction parameter is biased on a comparison of the first signal with a signal having linearity with respect to the detected displacement.

19. The method of claim 18, wherein the applying of the correction parameter to linearize the first signal comprises:
generating an intermediate parameter by interpolation based on the correction parameter; and
linearizing the first signal using the intermediate parameter and the correction parameter.

* * * * *